(12) United States Patent
McKee

(10) Patent No.: US 7,975,940 B2
(45) Date of Patent: Jul. 12, 2011

(54) SYSTEMS AND METHODS FOR REDUCING THE PARTICLE SIZE OF A POZZOLAN

(75) Inventor: Alan D. McKee, Benjamin, UT (US)

(73) Assignee: Staker & Parson Companies, West Haven, UT (US)

( * ) Notice: Subject to any disclaimer, the term of this patent is extended or adjusted under 35 U.S.C. 154(b) by 281 days.

(21) Appl. No.: 12/415,947

(22) Filed: Mar. 31, 2009

(65) Prior Publication Data

US 2010/0243771 A1 Sep. 30, 2010

(51) Int. Cl.
*B02C 19/00* (2006.01)

(52) U.S. Cl. ............... 241/1; 241/23; 241/65; 241/79.1; 241/301

(58) Field of Classification Search .............. 241/1, 301, 241/152.2, 65, 23, 29, 19, 79.1
See application file for complete search history.

(56) References Cited

U.S. PATENT DOCUMENTS

| | | |
|---|---|---|
| 1,509,266 A | 9/1924 | Spearman |
| RE19,049 E | 1/1934 | Pedelty |
| 2,501,698 A | 3/1950 | Stecker |
| 2,784,085 A | 3/1957 | Denning |
| 2,807,453 A | 9/1957 | Pierce |
| 3,133,804 A | 5/1964 | Hardgrove |
| 3,192,060 A | 6/1965 | Tilsen |
| 3,414,201 A | 12/1968 | Bixby |
| 3,512,722 A | 5/1970 | Hall |
| 4,002,462 A | 1/1977 | Maddox |
| 4,887,722 A | 12/1989 | Greenward, Sr. |
| 5,505,389 A * | 4/1996 | Sussegger et al. ............... 241/48 |
| 6,547,171 B1 * | 4/2003 | Fontanille ........................ 241/52 |
| 6,832,736 B2 * | 12/2004 | Miyamoto et al. ............... 241/19 |
| 7,381,261 B1 | 6/2008 | Nelson |
| 7,413,602 B2 | 8/2008 | Grasso, Jr. et al. |
| 7,537,655 B2 | 5/2009 | Abbate |
| 2001/0013559 A1 * | 8/2001 | Yamamoto et al. .......... 241/79.1 |
| 2002/0005148 A1 | 1/2002 | Moreau et al. |
| 2002/0017224 A1 | 2/2002 | Horton |
| 2002/0033120 A1 | 3/2002 | Berardi et al. |
| 2003/0189116 A1 * | 10/2003 | McCamley ................ 241/24.19 |
| 2008/0011190 A1 | 1/2008 | Remortel et al. |
| 2008/0250899 A1 | 10/2008 | Mecchi |
| 2009/0071374 A1 | 3/2009 | Van Deventer et al. |
| 2010/0034978 A1 | 2/2010 | Garuti, Jr. et al. |
| 2010/0242804 A1 | 9/2010 | McKee |
| 2010/0243770 A1 | 9/2010 | McKee |

FOREIGN PATENT DOCUMENTS

| | | |
|---|---|---|
| JP | 2896663 | 3/1999 |
| WO | WO9824733 | 6/1998 |
| WO | PCT/US2010/029474 | 3/2010 |

OTHER PUBLICATIONS

PCT/US2010/029474, Nov. 12, 2010, International Search Report.

\* cited by examiner

*Primary Examiner* — Bena Miller
(74) *Attorney, Agent, or Firm* — Workman Nydegger

(57) ABSTRACT

A system for reducing the particle size of a pozzolan includes a thermal fracture system and a defracturing apparatus. The system is highly efficient at drying and heating a natural pozzolan having a natural distribution of particle sizes. The system can create a reduced-size pozzolanic material with a desired particle size and particle morphology. The system for reducing the particle size of a pozzolan includes a thermal fracture system for heating and thermally fracturing the pozzolan and a defracturing apparatus that agitates the thermally fractured pozzolan to break the thermally fractured pozzolan apart.

27 Claims, 5 Drawing Sheets

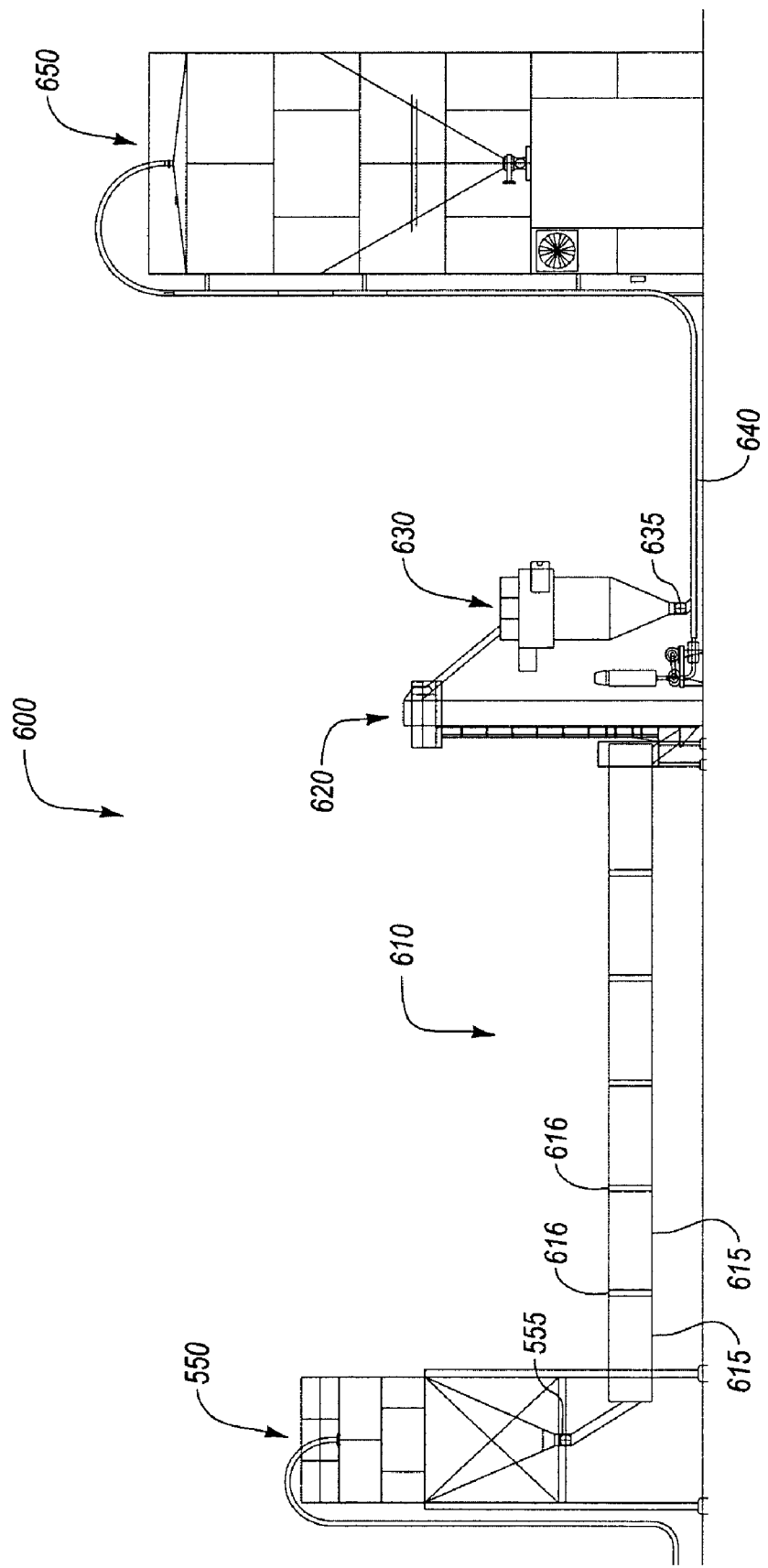

SYSTEMS AND METHODS FOR REDUCING THE PARTICLE SIZE OF A POZZOLAN

BACKGROUND OF THE INVENTION

1. The Field of the Invention

The present invention relates to apparatus for reducing the particle size of natural pozzolanic materials.

2. The Relevant Technology

A pozzolan is a material which, when combined with calcium hydroxide, exhibits cementitious properties. Because of its properties, pozzolans are commonly used as an admixture to Portland cement concrete mixtures to increase the long-term strength of the concrete and provide other beneficial properties. For example, when added to concrete, pozzolanic materials can improve the compressive strength, bond strength, abrasion resistance and other properties of the concrete.

Pozzolans are known to be slower reacting than Portland cement, primarily due to their lower content of tricalcium silicates. When used in large quantities, pozzolanic material tend to retard early strength development. To increase the reactivity of pozzolanic materials, pozzolans can be ground to create smaller pozzolanic particles. Grinding a pozzolan reduces the particle size and increases the surface area, which increases the reactivity of the particles.

To achieve a desired particle size, pozzolans are typically crushed in a grinding mill such as a ball mill. A ball mill is a horizontal cylinder partly filled with steel balls (or occasionally other shapes) that rotates on its axis, imparting a tumbling and cascading action to the balls. Material fed through the mill is crushed by impact and ground by attrition between the balls. The grinding media are usually made of high-chromium steel. The smaller grades are occasionally cylindrical ("pebs") rather than spherical.

BRIEF SUMMARY OF THE INVENTION

The present disclosure provides a system for reducing the particle size of a natural pozzolan using thermal fracturing. The system is highly efficient at drying and heating a natural pozzolan having a natural distribution of particle sizes. The system can create reduced-size pozzolanic material with a desired particle size and particle morphology. The system for reducing the particle size of a pozzolan includes a thermal fracture system for heating and thermally fracturing the pozzolan and a defracturing apparatus that agitates the thermally fractured pozzolan to break the thermally fractured pozzolan apart.

The thermal fracture system is configured to operate at temperature that will thermally fracture the pozzolan, which is a higher temperature than a dryer configured to simply dry a pozzolan. For example, the thermal fracture system can be configured to heat the pozzolan to a temperature in a range from about 220° F. to about 625° F.

In one embodiment, the thermal fracture system can be configured to retain smaller pozzolanic particles in the dryer for a shorter period of time than larger pozzolanic particles, on average. Retaining the larger particle in the dryer for a short period of time allows the larger particles to absorb more heat and reach the same temperature or even a higher temperature than the smaller pozzolanic particles. Thus, the system can fracture different sized pozzolanic particles to different extents so as to create a desired distribution of particles sizes (e.g., fracture larger particles more than smaller particles).

In one embodiment, the dryer used in the thermal fracture system is a drum dryer and the drum dryer can be set on an incline such that pozzolanic material flowing down the feed path is accelerated down the grade by gravity. The removal of the pozzolanic particles from the drum dryer can be controlled using a counter-flow of hot air. Pozzolanic particles flowing down the grade will be retained longer in the drum dryer if they are heavier and have more mass. Thus, heavier more massive particles flow through the dryer longer than lighter particles which are swept out of the dryer by the counter flow of hot air. Thus, less heat is expended on the smaller particles since the smaller particles are in the dryer for a shorter period of time.

In one embodiment, the dryer separates an incoming pozzolanic stream into at least a coarse fraction and a fine fraction and the coarse fraction is allowed to travel the entire length of the dryer and the coarse fraction is exposed to higher temperatures compared to the fine fraction. Allowing a portion of the pozzolanic material to flow all the way through the dryer allows a coarse portion of the incoming pozzolanic material to be heated to a maximum extent without subjecting the small particles to the same heating. For example, the air flow rate can be configured to allow less than 50% of the coarse fraction to pass through the dryer. In a preferred embodiment, the coarse material passing through the dryer (i.e., maximally heated) is in a range from about 0.5% to about 20%, more preferably about 1% to about 10%.

In a preferred embodiment, the dryer is operated using a light hydrocarbon fuel such as natural gas. Light hydrocarbon fuels such as natural have been found to limit the amount of carbon in the reduced-size pozzolanic material, which is advantageous for using the pozzolan in concrete manufacturing.

The defracturing system is configured to break apart the thermally fractured pozzolan to yield a reduced-size pozzolanic material. The defracturing system can include an agitation material (i.e., tumblers) that assists in breaking up the thermally fractured material.

The agitation causes the thermally fractured pozzolans to break apart at fracture sites created by the thermal fracturing. The defracturing system is configured to agitate as opposed to crush or grind. It has been found that crushing or grinding the pozzolan creates shards that reduces the flowability of the pozzolanic material. In contrast, agitating the pozzolanic material according to the invention breaks apart the thermally fractured pozzolan into globular particles, which is a desired morphology for using the pozzolanic material to manufacture concrete.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 5 discloses an example embodiment of the defracturing system of FIG. 3.

DETAILED DESCRIPTION OF THE PREFERRED EMBODIMENTS

I. Introduction

The present invention relates to natural pozzolanic materials with reduced particle sizes, as well as methods, systems, and apparatuses for making the same. Natural pozzolanic materials can provide a number of benefits when added to Portland cement concrete mixtures. In particular, natural pozzolanic materials can contribute to increased workability and compressive strength as well as other improved mechanical properties of the concrete mixture.

As found in natural deposits, natural pozzolanic material typically have particle sizes that are too large and/or irregular for the natural pozzolanic material to be feasibly used in a concrete mixture. As a result, natural pozzolanic materials are often subjected to grinding, crushing, and/or pulverizing processes in order to reduce the particle sizes and allow the natural pozzolanic material to be used in concrete mixtures. However, these common methods of reducing the particle sizes of natural pozzolanic materials may produce irregular, highly angular, and/or shard-like particles that increase the water demand and diminish the workability and other characteristics of concrete mixtures in which the natural pozzolanic materials are used.

Accordingly, the present disclosure provides an improved natural pozzolanic material with reduced particle sizes as well as methods, systems, and apparatuses for reducing the particle size of a natural pozzolanic material. In particular, the methods, systems, and apparatuses disclosed herein allow the particle size of the natural pozzolanic material to be reduced without compromising the corresponding workability, water demand, compressive strength, and other properties of concrete mixtures in which the natural pozzolanic material is added.

II. Methods of Reducing the Particle Size of a Pozzolan

Figure 1:
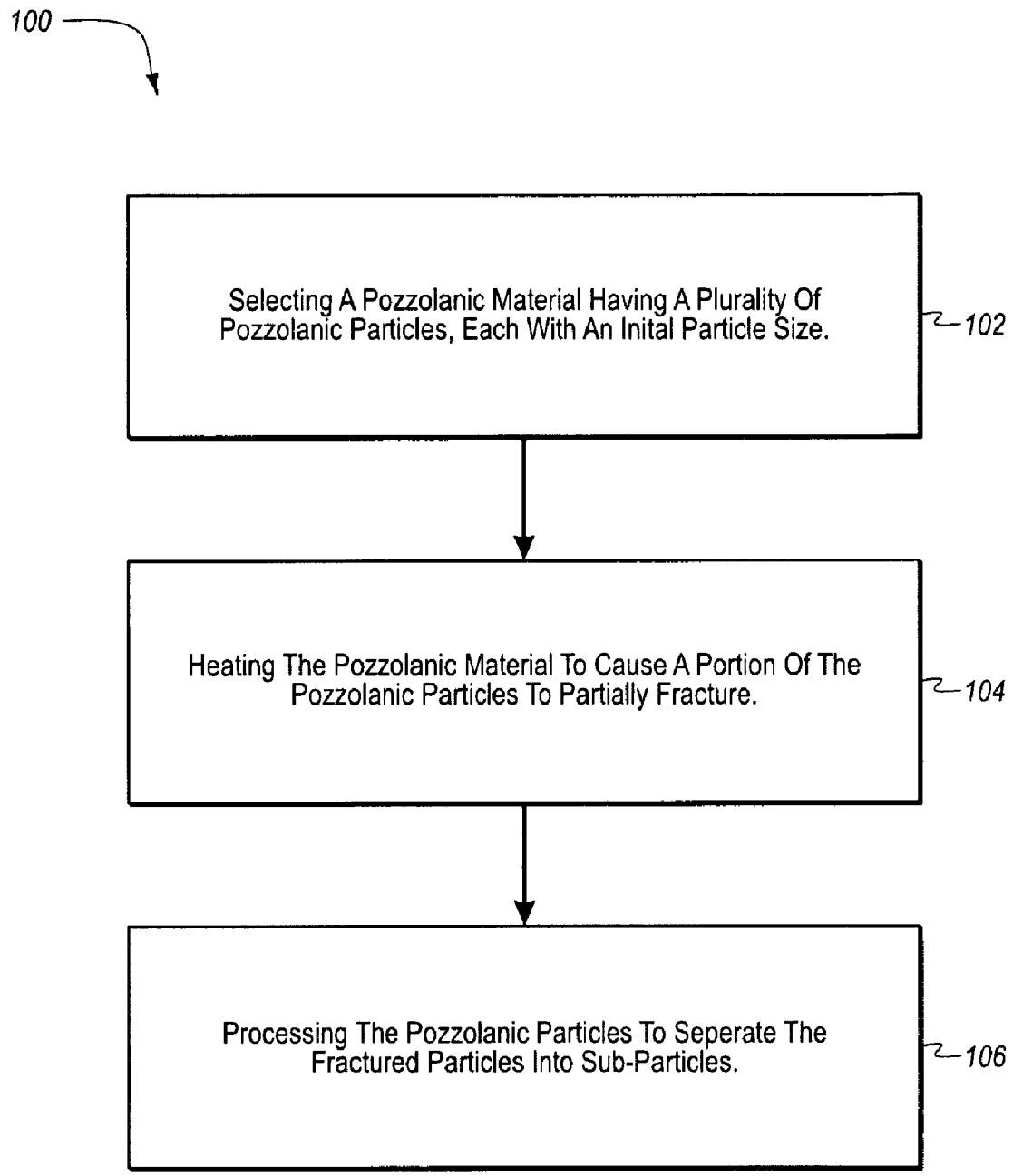
FIG. 1 discloses a flowchart representing a method for reducing the particle size of a pozzolan in accordance with an implementation of the present invention.
Figure 2:
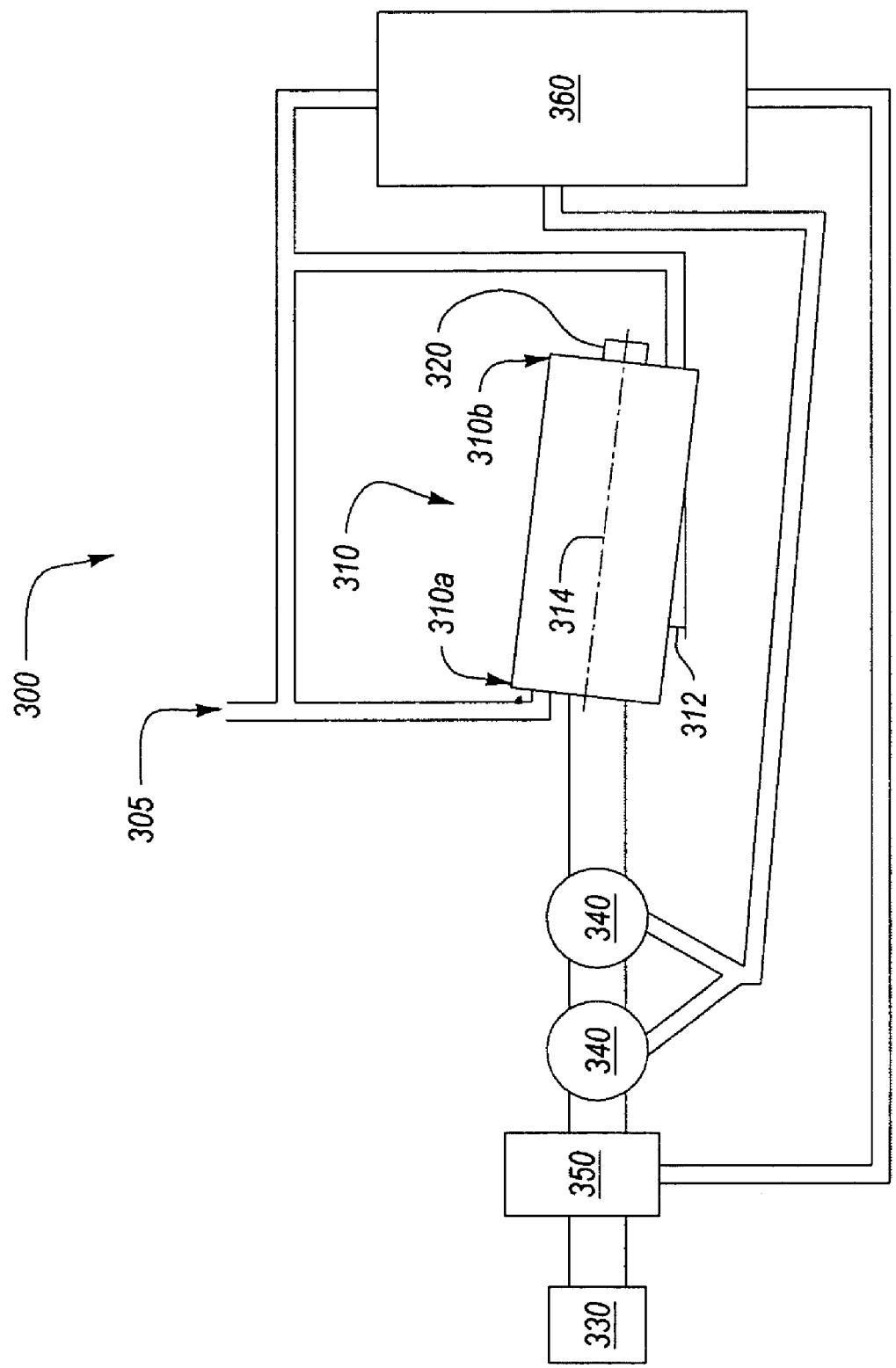
FIG. 2 discloses a schematic representation of an example thermal fracture system of a particle size reducing apparatus in accordance with an implementation of the present invention.

FIG. 1 discloses a method 100 for reducing the particle size of a pozzolanic material according to the present invention and can be broadly summarized as follows. First, a natural pozzolanic material is selected 102, wherein the particles of the selected natural pozzolanic material each have an initial particle size. The selected pozzolanic material is then heated to cause a portion of the particles of the selected pozzolanic material to partially fracture 104, thereby creating a plurality of fissures in the particles to define sub-particles. The pozzolanic material can then be processed to separate the sub-particles along the fissures 106, thereby yielding a pozzolanic material with reduced-sized particles.

A. Natural Pozzolan

A first step of an example method for reducing the particle size of a natural pozzolan includes selecting a natural pozzolanic material. As used herein, the term "natural pozzolanic material" refers to pozzolanic material originating from naturally occurring pozzolan deposits, such as volcanic ash deposits. In one embodiment, the natural pozzolanic material can be mined from a natural deposit. The term "natural pozzolanic material" does not include fly ash, silica fume, metakaolin, or ground granulated blast furnace slag.

The selected natural pozzolanic material includes a plurality of pozzolanic particles, each having an initial particle size. The initial particle size of the pozzolanic particles can be any size found in a natural pozzolanic material. Typical examples of particle sizes for natural pozzolanic materials include deposits with an average particle size in a range from about 40 microns to 120 microns or alternatively in a range from 60 microns to 90 microns.

The natural pozzolan can be any natural pozzolan that has a particle size larger than that desired for use in concrete and that can be thermally fractured. Examples of suitable types of natural pozzolans include any volcanic ash such as, but not limited to, perlite, tuft, and basalt. Deposits of these pozzolanic materials can be found throughout various parts of the world. Moreover, those skilled in the art are familiar with techniques for extracting natural pozzolanic materials from deposits using known mining techniques.

Typically, it can be advantageous to initially have at least some moisture in the natural pozzolan so as to facilitate thermal fracturing. Most, if not all, naturally occurring pozzolans have some moisture content and often times, the amount is somewhat constant throughout the natural deposit of pozzolan. When used in the process of the present invention, the selected pozzolanic material may have an initial moisture content similar to the natural deposit or may have a moisture content that is less or greater than the natural pozzolan. In other words, moisture can be added to the pozzolan or the pozzolan can be dried to ensure a desired and/or consistent moisture content. In one embodiment, the moisture content of the pozzolan at the outset of the method for reducing the particle size is in a range from about 4% by weight to about 16% by weight.

B. Heating the Natural Pozzolan

As mentioned, a subsequent step of the method of reducing the particle size of a pozzolan includes heating the selected pozzolanic material to cause a portion of the particles of the selected pozzolanic material to fracture. In one embodiment, the temperature to which the pozzolanic material is heated is preferably sufficient to fracture at least a portion of the particles of the pozzolanic material. This temperature is referred to herein as a "fracture temperature" or "thermal fracture temperature".

The thermal fracture temperature can be varied to achieve a desired particle size. In general, for a given pozzolanic material and moisture content, a higher thermal fracture temperature will result in smaller particles and lower thermal fracture temperatures results in larger particles. In one embodiment, the thermal fracture temperature can be in a range from about 2200 Fahrenheit to about 6250 Fahrenheit, preferably from about 2500 Fahrenheit to about 5000 Fahrenheit, more preferably from about 3000 Fahrenheit to about 4500 Fahrenheit and most preferably from about 3500 Fahrenheit to about 4000 Fahrenheit. In one example embodiment, the fracture temperature can be about 3750 Fahrenheit.

By heating the pozzolanic material, the pozzolanic particles can be thermally fractured. Causing the particles to fracture can create a plurality of fissures (or thermal fracture lines) in the particles that define sub-particles of the fractured particles. The thermal fracture of the particles may result from the expansion of moisture trapped within the particles.

For example, each pozzolanic particle can contain a certain amount of moisture in voids within the particle. As the water trapped within the particle is heated past the boiling point, it can turn into pressurized steam. The pressure of the steam can continue to increase as its heat rises until the particle reaches a breaking point. The particle may at least partially rupture, thereby releasing the pressurized steam. The particle may either partially fracture along one or more fissures defining sub-particles, or the particle may entirely fracture along one or more fissures and separate into one or more sub-particles. In one example embodiment, the pozzolanic material can be heated to cause more than about 25% of the particles to fracture, more preferably more than about 50% of the particles, and most preferably more than about 75% of the particles.

It has been found that by thermally fracturing the particles of the pozzolanic material into sub-particles, a desired shape of the sub-particles can be achieved. For example, it is believed that the thermal fracture process described herein fractures the pozzolanic particles along natural fracture lines which define sub-particles having a more regular shape than is produced by physically or mechanically fracturing the particles, such as by pulverizing or crushing, which results in more jagged or shard-like particles. In one example embodiment, the resulting sub-particles can have a substantially spheroidal shape. As used herein, "spheroidal" includes spherical, approximately spherical, round, approximately round, rounded, ball shaped, clump shaped, globular, orbicular, and/or similar shapes.

C. Processing the Natural Pozzolan

Once heated to fracture a portion of the particles, the pozzolanic material can then be processed in order to separate the particles along the fracture line into sub-particles. Processing the pozzolanic material can thereby yield a pozzolanic material having reduced particle sizes.

Processing the thermally fractured particles can include, but is not limited to, milling, tumbling, vibrating, agitating, stirring, shaking, air classifying, and/or other similar procedures. It may be important that processing the pozzolanic material does introduce a significant amount of physical or mechanical fractures in the pozzolanic particles, such as by grinding, crushing, and/or pulverizing. In one example embodiment, processing the pozzolanic particles introduces physical or mechanical fractures in less than about 50% of the particles, more preferably in less than about 30% of the particles, and most preferably in less than about 15% of the particles.

The resulting pozzolanic material will have smaller particles than before the pozzolanic material was heated to a thermal fracture temperature and then processed. In one example embodiment, at least about 95% by volume of the particles of the resulting pozzolanic material have a diameter smaller than about 50 microns, more preferably smaller than about 40 microns, and most preferably smaller than about 38 microns. In an additional configuration, at least about 99% of the particles have a diameter smaller than about 38 microns.

The median size of the particles of the resulting pozzolanic material can also be reduced. For example, in one configuration, the median size of the pozzolanic particles ranges from about 1 micron to about 25 microns, more preferably from about 3 microns to about 15 microns, and most preferably from about 6 microns to about 10 microns.

In a further embodiment, additional steps may be taken to further reduce the particle size of the resulting pozzolanic material. For example, the particles of the pozzolanic material may be separated based on particle size, such as by using an air classifier. Particles having a particle size greater than a desired particle size may be removed and then further fractured and/or processed until a desired particle size is achieved. Alternatively, these particles may be discarded.

The resulting pozzolanic material with reduced-size particles can have moisture content less than before thermal fracture and processing. In one example embodiment, the resulting pozzolanic material with reduced-size particles has a moisture content of less than about 4% by volume, more preferably less than about 2% by volume, and most preferably less than about 1% by volume.

The resulting pozzolanic material may also have relatively low carbon content. For example, the carbon content of the resulting pozzolanic material can be less about 4% by volume, more preferably less than about 2% by volume, and most preferably less than about 1% by volume.

The substantially spheroidal shape of the particles of the resulting pozzolanic material can reduce the friction between multiple pozzolanic particles and/or between the pozzolanic particles and other particles of a cement or concrete mixture. Accordingly, the resulting pozzolanic material can reduce the water demand and enhance the workability of cement or concrete mixture. In addition, the pozzolanic material of the present invention can improve other characteristics and properties of a cement or concrete mixture in which the pozzolanic material is added.

III. Natural Pozzolanic Materials with Reduced Particle Sizes

The pozzolanic materials of the present invention have reduced-size particles compared to the natural deposit from which the natural pozzolan originated from. In addition, the methods used to reduce the particle size produces a natural pozzolan with a substantially spheroidal shape. For purposes of this invention, the term substantially spheroidal means "sphere-like" or "globular" as opposed to shard-like. Nevertheless, because the pozzolans are fractured along natural crystal planes, very few, if any, of the particles are perfectly round.

As a result of their substantially spheroidal shape, the pozzolanic materials can improve the workability of a cement paste or concrete mixture by reducing the friction between particles within a cement paste or concrete mixture (as compared to pozzolanic particles that are crushed). In addition, the pozzolanic materials of the present invention can improve other characteristics and properties of a cement paste or concrete mixture in which the pozzolanic materials are added.

The pozzolanic materials of the present invention can have desirably small particle sizes. In one example embodiment, at least about 95% of the particles by volume have a diameter smaller than about 50 microns, more preferably smaller than about 40 microns, and most preferably smaller than about 38 microns. In an additional configuration, at least about 99% of the particles have a diameter smaller than about 38 microns.

The median size of the particles of the pozzolanic material of the present invention can also be desirably small. For example, the median size of the particles of the pozzolanic material of the present invention can range from about 1 micron to about 25 microns, more preferably from about 6 microns to about 15 microns, and most preferably from about 8 microns to about 12 microns.

The moisture content of the pozzolanic material of the present invention can be less than other natural pozzolanic materials. In particular, in one example embodiment, the water content of the reduced sized pozzolanic material can be less than about 4% by volume, more preferably less than about 2% by volume, and most preferably less than about 1% by volume.

The carbon content of the pozzolanic material of the present invention may also be less than other pozzolanic materials (e.g., less than fly ash). For example, the carbon content of the pozzolanic material can be less than about 4% by volume, more preferably less than about 2% by volume, and most preferably less than about 1% by volume, or even substantially free of carbon.

The reduced-size particles of the pozzolanic material can have a substantially spheroidal shape with more rounded and/or regular shapes. In contrast, particles being reduced in size by grinding have angular, jagged, edges that result in a shard-like shape.

The pozzolanic material of the present invention may be included in a cement or concrete composition. In particular, the pozzolanic material described above can be included with Portland cement and water to form a cement paste. In a further embodiment, aggregate can be added to the cement paste to form a concrete mixture. As mentioned above, the pozzolanic material of the present invention can improve the physical and other characteristics of the cement or concrete compositions in which the pozzolanic material is added.

For example, the replacement of cement with the pozzolanic material of the present invention can reduce the water demand of a concrete mixture for a given slump. In one example embodiment, when the pozzolanic material of the present invention is Mused as about 20 percent of the total cementitious materials of a concrete mixture, the water demand of the concrete mixture can be reduced by more than about 5 percent, preferably by more than about 10 percent, for a given slump. In further embodiments, higher pozzolanic material contents can yield higher water reductions. In addition, the pozzolanic material of the present invention may improve other characteristics of the concrete mixture, such as compressive strength.

IV. Apparatus for Reducing the Particle Size of a Pozzolan

An apparatus for reducing the particle size of a pozzolan is disclosed. The particle size reducing apparatus may include a thermal fracture system and a defracturing system. The thermal fracture system may be configured to heat a pozzolanic material to a thermal fracture temperature, as described above, as well as perform other related steps. The defracturing system may be configured to process the pozzolanic material to break apart fractured particles into sub-particles as well as perform other related steps. In further embodiments, the particle size reducing apparatus may also include other systems and/or devices.

In one embodiment, the thermal fracture system can be configured to heat smaller pozzolanic particles for a shorter period of time than larger pozzolanic particles, and/or heat larger particles at a higher temperature than smaller particles. For example, in one embodiment, larger particles can be selectively retained in a forced-air dryer for a longer period of time than relatively smaller particles to allow the larger particles to absorb more heat. The additional heat absorbed by the larger particles can raise the temperature of the larger particles to a desired thermal fracture temperature. In one embodiment, the additional heating of the larger pozzolanic particles can cause the larger particles to undergo more extensive thermal fracturing, which can reduce the particle size of the larger particles more compared to smaller sized particles. Thus, the system can fracture different sized pozzolanic particles to different extents so as to create a desired distribution of particles sizes (e.g., fracture larger particles more than smaller particles).

Figure 3:
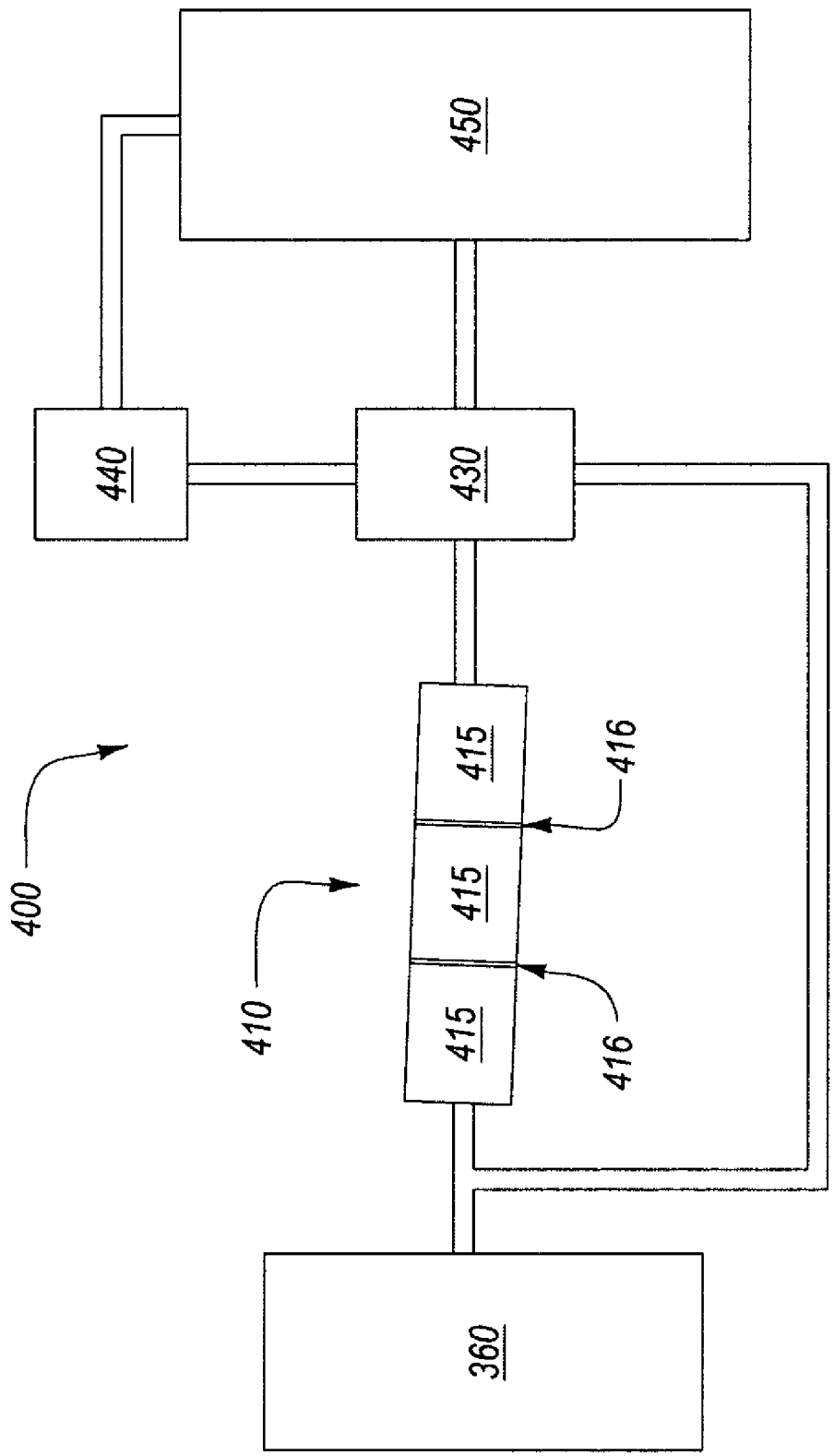
FIG. 3 discloses a schematic representation of an example defracturing system of a particle size reducing apparatus in accordance with an implementation of the present invention.

FIG. 3 discloses a schematic diagram of a portion of an example particle size reducing apparatus. In particular, FIG. 3 illustrates an example thermal fracture system 300. In one embodiment, the thermal fracture system 300 can perform one or more of the steps of the methods of reducing the particle size of a pozzolan as disclosed in more detail above. In particular, the thermal fracture system 300 may include one or more components configured to heat a selected pozzolanic material to cause a portion of the pozzolanic particles to partially fracture.

In one embodiment, the thermal fracture system 300 may comprise a cylindrical fracture drum 310 that is used to heat the pozzolanic materials (e.g., using hot forced air). The fracture drum 310 can be positioned at an angle 312 from a horizontal position and can be configured to rotate about its longitudinal axis 314. The angle 312 of the fracture drum 310 with respect to a horizontal position may vary according to different configurations. In one example embodiment, the angle 312 can range from about 1° to about 30°.

The fracture drum 310 may have an open upper end 310a and an open lower end 310b. The diameter of the fracture drum 310 may vary as desired for a particular configuration. For example, the diameter of the fracture drum 310 may range from about 1' to about 15'. The length of the fracture drum 310 may also vary as desired. In particular, the length of the fracture drum 310 can range from about 5' to about 120'.

Pozzolanic material may be introduced into the upper end 310a of the ° fracture drum 310 through an input 305, such as a hopper. The pozzolanic material may travel toward the lower end 310b as the fracture drum 310 rotates. The pozzolanic material may be tumbled and/or otherwise agitated as it travels through the rotating fracture drum 310. In particular, the fracture drum 310 may include one or more flutes (not shown) on the interior surface of the fracture drum 310 to assist in tumbling and/or tossing the pozzolanic material as it travels through the fracture drum 310. The rotational speed of the fracture drum 310 can vary depending on a desired configuration. For example, the rotational speed of the fracture drum 310 can range from about 10 RPM to about 100 RPM, more preferably from about 20 RPM to about 60 RPM, and most preferably from about 30 RPM to about 45 RPM.

The thermal fracture system 300 may also include a heating element 320. For example, the heating element 320 may comprise a burner positioned proximate to or at least partially within the fracture drum 310. In one example configuration, the heating element 320 can be positioned proximate the lower end 310b of the fracture drum 310 and can be configured to direct heat into the interior cavity of the fracture drum 310 from the lower end 310b towards the upper end 310a. As a result, pozzolanic material traveling through the fracture drum 310 can be heated to cause a portion of the pozzolanic particles to fracture.

The heating element 320 may produce heat by burning one or more combustible materials. For example, the heating element 320 may burn methane, propane, butane, heptane, octane, and the like. In a further embodiment, it may be important to use a combustible material with a per molecule carbon atom total equal to or less than about 8 to reduce the amount of carbon atoms adsorbed by the pozzolanic material during the thermal fracture process. In particular, the heating element 320 can burn liquid natural gas or liquid propane. In yet further embodiments, the heating element may produce heat via electricity, microwaves, infrared radiation, ultraviolet lights, and/or other similar heat-producing sources.

The heating element 320 can be configured to heat the pozzolanic material traveling through the fracture drum 310 to a thermal fracture temperature. For example, the heating element 320 can heat the pozzolanic material to a temperature in the range of about 220° Fahrenheit to about 625° Fahrenheit, preferably from about 250° Fahrenheit to about 500° Fahrenheit, more preferably from about 300° Fahrenheit to about 450° Fahrenheit and most preferably from about 350° Fahrenheit to about 400° Fahrenheit. As explained in more detail above, heating the pozzolanic material can cause at least a portion of the pozzolanic particles to partially fracture into smaller sub-particles. In one example embodiment, heating the pozzolanic material can cause more than about 25% of the pozzolanic particles to at least partially fracture, preferably more than about 50%, more preferably more than about 75%.

The extent of thermal fracturing will depend in part on the temperature of the heating element, the duration of the particles in the heat generated from the heating element and the proximity of the particles to the heating element. In general, the closer the particles are to the source of the heat, the hotter the flame and the hotter the particles will be heated and thus the more extensive the thermal fracturing will be.

In general, to increase the flow of pozzolanic material through the drum 310, the force of the counter-flowing hot air is reduced and the angle 312 of drum 310 is increased. Alternatively, the flow of pozzolanic material through drum 310 can be reduced by decreasing angle 312 and/or increasing the airflow of hot gases.

In addition to thermally fracturing the pozzolanic material, the thermal fracture system 300 may also reduce the water content of the pozzolanic material. As explained in more detail above, heating pozzolanic material to a thermal fracture temperature can release moisture trapped within the pozzolanic particles. Additional moisture, such as on the surface of the particles, may also evaporate as a result of the heat. Consequently, pozzolanic materials exiting the fracture drum 310 can have water content less than when the pozzolanic materials were introduced into the thermal fracture system 300. In particular, the water content of the thermally fractured pozzolanic material can be less than about 4% by volume, preferably less than about 2% by volume, more preferably less than about 1% by volume.

In alternative embodiments, the thermal fracture system 300 may also include any devices and/or components configured to heat the pozzolanic material to a thermal fracture temperature. For example, the thermal fracture system 300 may comprise one or more ovens into which the pozzolanic material may be introduced and heated to a thermal fracture temperature. In a further embodiment, the thermal fracture system 300 may comprise a conveyer belt system combined with one or more heating elements 320 to heat pozzolanic materials being carried by the conveyer belt system to a thermal fracture temperature. Furthermore, one will appreciate that additional methods of heating the pozzolanic material to a thermal fracture temperature may be used.

The thermal fracture system 300 may also include one or more elements for efficiently heating different sized particles for different amounts of time. For example, the thermal fracture system 300 may include a draft fan 330 that draws a back draft of air flow through the fracture drum 310 flowing from the lower end 310b to the upper end 310a. In one example embodiment, the back draft created by the draft fan 330 can carry smaller, lighter particles within the fracture drum 310 out of the upper end 310a, while larger, heavier particles continue to travel and tumble through the fracture drum 310 until they become light enough to be carried by the back draft or until they are discharged out the lower end 310b.

A portion of the pozzolanic particles traveling through the fracture drum 310 can become lighter and/or smaller by being thermally fractured into sub-particles and/or by having their water content reduced. As a result, these particles may become small and light enough to be carried out the upper end 310a of the fracture drum 310 by the back draft. The particles that do not achieve a small enough size and/or weight necessary to be carried by the back draft can be discharged through the lower end 310b. As a result, different sized and shaped particles can be respectively heated different amounts. In particular, smaller, lighter particles, which require less energy to achieve a thermal fracture temperature, may remain within the fracture drum 310 for only a short period of time, while larger, heavier particles that require more energy to achieve a thermal fracture temperature may remain in the fracture drum 310 for a longer period of time. Accordingly, by removing particles once they have reached a desired particle size, the thermal fracture system 300 can more efficiently allocate energy used in heating the pozzolanic material to the particles that need it most and not overheat particles that have already achieved a desired particle size.

The amount of heat produced by the heating element 320 and the volume of air flow generated by the draft fan 330 can be varied as necessary to achieve a desired distribution of heat and energy and to achieve a particular temperature in each of the particles. In one embodiment, the air flow and fracture temperature are configured such that a majority of the particles exit the fracture drum 310 with the back draft created by the draft fan 330 through the upper end 310a while a minority of the pozzolanic particles are discharged from the lower end 310b. The volume of air flow created by the draft fan 330 can range from about 50 cubic feet per minute (CFM) to about 450 CFM, more preferably from about 200 CFM to about 350 CFM, and most preferably from about 250 CFM to about 300 CFM. The air flow and/or temperature may also be varied based on the elevation and/or humidity where the thermal fracture system is located.

Particles carried out the upper end 310a of the fracture drum 310 by the back draft can be collected using one or more particle collection devices. For example, the back draft can carry the particles from the fracture drum 310 into one or more cyclone dust collectors 340. The cyclone dust collectors 340 can separate particles out of the back draft that are larger than a particular size while particles smaller than a particular size remain suspended within the air flow of the back draft. In one example embodiment, the cyclone dust collectors 340 may collect particles having a particle size between about 30 microns and about 75 microns. Once collected, the particles can be transported to an intermediate storage device 360.

The remaining particles suspended in the air flow of the back draft can be further collected using one or more baghouses 350. For example, the baghouse(s) 350 may collect particles that have a particle size of less than about 30 microns. Once collected by the baghouse(s) 350, these particles may also be transported to the intermediate storage device 360.

As mentioned above, particles that are too heavy and/or large to be carried out of the upper end 310a of the fracture drum 310 by the back draft may be discharged from the lower end 310b of the fracture drum 310. These particles may be recycled through the fracture drum 310 or may be transported to the intermediate storage device 360 to be stored with the other particles.

In one embodiment it can be preferably to set the air-flow and angle of the drum such that a majority of the thermally fractured pozzolanic material is collected in the baghouse rather than traveling through the entire drum. Thus, the heating element can have a section of high heat for fracturing the largest and most difficult to fracture particles, without subjecting the rest of the particles to such high heat, which could waste energy and/or over fracture the smaller particles or change their chemical properties. In a preferred embodiment, the coarse fraction that enters the hottest zone of drum 310 and/or passes through drum 310 to exit end 310b is about 0.5% to about 20% by weight of the pozzolanic material (after being dried). More preferably the coarse fraction is between about 1% and 10% by weight of the pozzolanic material.

Figure 4:
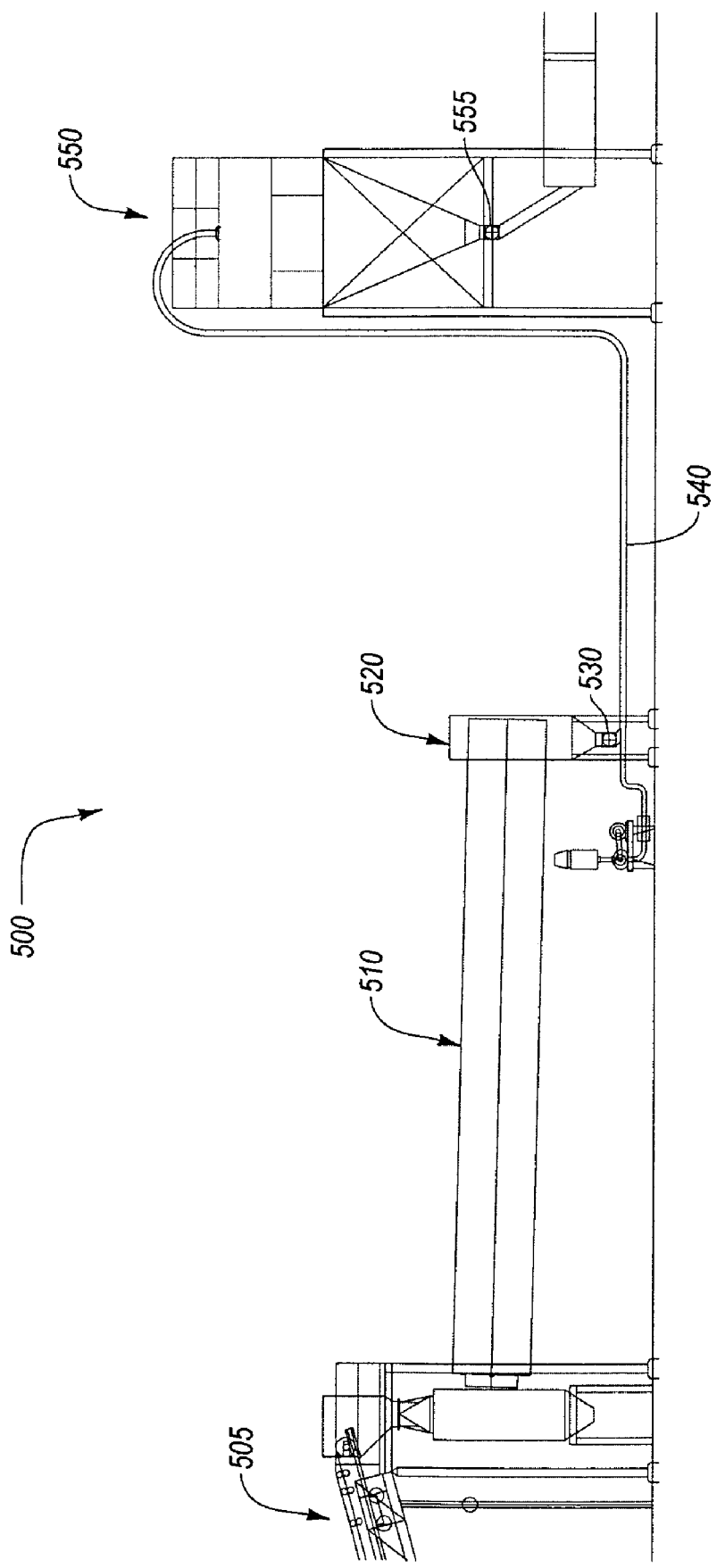
FIG. 4 discloses an example embodiment of the thermal fracture system of FIG. 2.

From the immediate storage device 360, the pozzolanic material can be introduced into a defracturing system 400, as disclosed in FIG. 4. The defracturing system 400 may include one or more components configured to separate the particles into sub-particles defined by thermal fracture lines, thereby yielding a pozzolanic material with reduced-size particles. Upon exiting the defracturing system 400, particles larger than a desired particle size may be removed and either discarded or recycled through the thermal fracture system 300 and/or defracturing system 400. Particles equal to or smaller than a desired particle size can be transported into a final storage device 450.

The defracturing system 400 can comprise one or more devices configured to agitate the particles and induce separation along thermal fracture lines without introducing a significant amount of new physical or mechanical fracture lines in the particles. Breaking apart the particles by agitating the particles prevents minimizes the percentage of particles that form shards, which is typically the morphology achieved using traditional grinding techniques to reduce particle size.

In one example embodiment, the defracturing system 400 can comprise a processing mill 410. The processing mill 410 may include one or more cylindrical processing drums 415 positioned in parallel and/or in series. In one example embodiment, the processing mill 410 includes a plurality of processing drums 415 positioned in series coupled end to end. For example, each processing drum 415 can have flanged ends to connect with the corresponding flanged ends of the subsequent and/or preceding processing drums 415 in a series, such as by welding, bolting, and/or otherwise. In a further embodiment, the processing mill 410 can include a second series of processing drums 415 in parallel with another series of processing drums 415. The length of the processing mill 410 can range from about 3' to about 120'. The diameter of the processing drums 415 may also vary in size and can range from about 12" to about 120".

The processing mill 410 may also include one or more baffles 416 positioned within or between the processing drums 415 intermittently along the length of the processing mill 410. In one embodiment, the baffles 416 may be positioned between consecutive processing drums in a series of processing drums. The baffles 416 may be configured to inhibit and/or regulate the flow of pozzolanic material through the processing mill 410 to ensure that the pozzolanic particles remain in the processing mill 410 for sufficient time to properly separate before being discharged from the processing mill 410. Each baffle 416 may comprise, for example, a plate or screen including a plurality of apertures for the passage of pozzolanic particles. The size and shape of the apertures may vary from baffle 416 to baffle 416 along the length of the processing mill 410. The diameter of the apertures may range from about ¼" to about 3".

The processing mill 410 may also include a plurality of trunions (not shown) to support and facilitate the rotation of the processing mill 410. In one example, the processing mill 410 rotates on at least one set of steel barring load rubber wheeled trunions. In addition, the processing mill 410 may comprise a motor coupled to the processing mill 410 through a gear drive to rotate the processing mill 410. The motor/gear drive combination may rotate the processing mill 410 at a speed ranging from about 10 RPM to about 120 RPM, more preferably from about 20 RPM to about 90 RPM, and most preferably from about 30 RPM to about 60 RPM.

The processing mill 410 may also contain one or more tumblers (not shown) configured to prevent the pozzolanic material from adhering to the inner walls of the processing drum 415 and agitate the thermally fractured pozzolanic material as it travels through the processing mill. The tumblers can be any solid object large enough to not pass through the apertures in the baffles 416. The tumblers can be regular or irregular in shape. For example, the tumblers can have a rod shape, diamond shape, cone shape, polygon shape, spherical shape, spheroidal shape, and/or other similar shapes. In addition, the tumblers can include one or more of a variety of materials. For example, the tumblers can include polyurethanes, polymers, rubbers, synthetic rubber, metals, and/or other similar materials.

In addition—or as an alternative—to tumbling the pozzolanic material, the defracturing system 400 may exert additional forces on the pozzolanic particles to separate the particles along thermal fracture lines or fissures into sub-particles. For example, the defracturing system 400 may exert vibrational forces, static electric forces, frictional forces, and/or other similar forces to assist in separating the particles into the sub-particles defined by the thermal fracture lines. For example, the processing mill 410 may be vibrated either continuously or intermittently. In a further embodiment, the tumbling action of the processing mill 410 may create static electrical charges between particles that may assist in separating sub-particles. One will appreciate that additional methods may also be used to separate the fractured particles into sub-particles.

It may be important that the defracturing system 400 not introduce additional physical or mechanical fractures, such as by pulverizing or crushing, in the pozzolanic particles in order to maintain the substantially spheroidal shape of the sub-particles. In one embodiment, the defracturing system 400 introduces physical or mechanical fractures in less than about 50% of the pozzolanic particles, more preferably less than about 30%, and most preferably less than about 15%.

One way to reduce the amount of fracturing caused by the processing mill is to use tumblers (i.e., agitation material) that are substantially larger than the particle size of the thermally fractured pozzolan. operate the drum well below the critical speed of rotation. The crushing of particles in a traditional mill is generally accomplished by rotating the mill near the critical speed such that the grinding balls will travel up the wall of the mill and then fall from the roof of the mill and crush the pozzolanic material. This grinding action can be avoided by configuring the defracturing apparatus to operate well below the critical speed of the mill such that the agitation material does not fall a sufficient distance to cause crushing. In this manner the tumblers used in the system of the invention can agitate without grinding. In one embodiment, the processing mill is a drum that is operated within about 1% to 50% of the critical speed, more preferably about 5% to about 30%. Alternatively, grinding can be minimized by using agitation material that is relatively soft, such as a hard rubber or other non-metallic material. In addition, the agitation material is preferably not spherical. In one embodiment, the agitation material includes points, prongs, and/or facets (e.g., a material that is shaped like a jack). In a preferred embodiment, the agitation material has a size in a range from about 0.5 inches to about 6 inches, more preferably in a range from about 1 inch to about 4 inches.

Once the pozzolanic particles are processed and then discharged from the defracturing system 400, they can be introduced into a particle separator 430. For example, particle separator 430 can include one or more air classifiers to separate the particles based on particle size. As a result, particles having a particle size greater than a desired particle size can be separated out of the pozzolanic material and either discarded or recycled through the thermal fracture system (e.g., 300, FIG. 3) and/or defracturing system 400. In one example embodiment, the particle separator 430 can separate out particles having a diameter greater than about 50 microns, more preferably greater than about 40 microns, and most preferably greater than about 38 microns.

The remaining particles having particle sizes equal to or smaller than a desired particle size can be transported into a final storage device 450. One or more baghouses 440 may be used in conjunction with the particle separator 430 to filter pozzolanic particles from the discharge of the particle separator 430.

As disclosed above, the thermal fracture system 300 and defracturing system 400 may each include one or more baghouses (e.g., 350, FIG. 3; 440, FIG. 4). These baghouses 350, 440 may be coupled to one or more baghouse cleaning systems (not shown), such as a pulse jet system, a shaker system, a reverse air system, similar systems, and/or combinations of the same. The baghouse cleaning systems can assist in removing pozzolanic particle accumulations from the baghouses 350, 440, which can then be discarded or transported to the final storage device 450.

FIG. 5 illustrates an example embodiment of the thermal fracture system of FIG. 3. In particular, FIG. 5 discloses a thermal fracture system 500 including a fracture drum 510 fed by a conveyer system 505. The example fracture drum 510 has a length of at least 46' and a diameter of at least 9'. The fracture drum 510 can enclose a three million BTU burner (not shown) fueled by Natural Liquid Propane. The fracture drum 510 can feed into a discharge box 520 and then pass through an Air Lock Star valve 530 and blown through a 6" pipe 540 into a 30-ton intermediate storage silo 550.

From the intermediate storage silo 550, the pozzolanic material can travel through another Air Lock Star valve 555 and into the defracturing system 600 illustrated in FIG. 6. The defracturing system 600 can include a processing mill 610 having a length of about 60' and a diameter of about 48." The processing mill 610 can include a series of six spool chambers 615 flanged at both ends and bolted together. The spool chambers 615 can be separated by filter flanges 616 each including a plurality of holes. The first two filter flanges 616 in the series can have ¾" holes while the remaining filter flanges 616 can have ½" holes. The first two spool chambers 615 can each be filled with 1150 pounds of 1½" A210 hardened steel balls while the remaining spool chambers 615 in the series can each include 1230 pounds of 1" A210 hardened steel balls. The processing mill 610 can be driven by a 200 hp 1760 RPM GE 3 phase motor interlocked with a Walker Thompson 50-to-1 ratio gear drive. The processing mill can be positioned on an eight-percent grade and rotated at about 46 RPM.

The defracturing system 600 can also include fully-enclosed bucket elevator 620 to transport pozzolanic material from the processing mill 610 to an AB1012 30-ton per hour centrifuge air classifier 630 lined with Alumina Ceramic for abrasion resistance. The air classifier 630 can be set to reject particles that are not 37 microns or smaller while particles that are 37 microns or smaller can be transported through an Airlock Star Valve 635 and into a 6" pressure line 640, from which they can be blown into a finish product silo 650.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for reducing the particle size of a natural pozzolan, comprising:
    a source of a pozzolanic material;
    a thermal fracture system that includes a dryer configured to thermally fracture the pozzolanic material;
    a feed mechanism coupled to the dryer and configured to introduce the pozzolanic material into the dryer; and
    a defracturing apparatus configured to agitate the thermally fractured pozzolan so as to break apart the thermally fractured pozzolan into smaller-sized particles.

2. A system as in claim 1, wherein the pozzolanic material is a natural pozzolanic material.

3. A system as in claim 1, further configured to retain smaller pozzolanic particles in the dryer for a shorter period of time than larger pozzolanic particles, on average.

4. A system as in claim 3, wherein the dryer is a drum dryer.

5. A system as in claim 4, wherein the drum dryer separates an incoming pozzolanic stream into at least a coarse fraction and a fine fraction, wherein the coarse fraction is exposed to higher temperatures in the dryer compared to the fine fraction.

6. A system as in claim 5, wherein thermal fracture system is configured to allow from about 0.5% to about 20% of the coarse fraction to pass through a hottest section of the dryer.

7. A system as in claim 5, wherein thermal fracture system is configured to allow from about 1% to about 10% of the coarse fraction to pass through a hottest section of the dryer.

8. A system as in claim 1, wherein the dryer has a feed path with a grade, the grade allowing gravity to accelerate at least a portion of the pozzolanic material down the feed path.

9. A system as in claim 7, wherein the grade of the feed path is in a range from 2% to 12%.

10. A system as in claim 8, wherein the dryer is configured to produce air that flows along the feed path against the grade.

11. A system as in claim 1, wherein the dryer is a natural gas dryer, the system further comprising a natural gas source coupled to the dryer.

12. A system as in claim 1, wherein the defracturing apparatus is configured to agitate thermally fractured pozzolanic particles so as to yield globular shaped particles for a majority of the reduced-size particles.

13. A system as in claim 1, wherein the defracturing apparatus includes a plurality of tumblers comprising a non-metallic material.

14. A system as in claim 1, wherein the non-metallic material is a polymer, rubber, polyurethane, and/or synthetic rubber.

15. A system as in claim 1, wherein the tumbler has a diameter of at least 1 inch.

16. A method for using an apparatus to reduce the particle size of a pozzolan, comprising:
    providing a source of a natural pozzolanic material;
    providing a dryer suitable for heating the natural pozzolanic material;

introducing the pozzolanic material into the dryer and heating the pozzolanic material to a thermal fracturing temperature thereby thermally fracturing the pozzolanic material; and processing the thermally fractured pozzolan in a defracturing apparatus configured to agitate the thermally fractured pozzolan, so as to yield a reduced-size pozzolanic material.

17. A method as in claim 16, wherein the agitation is carried out in a rotating drum.

18. A method as in claim 15, wherein the agitation yields reduced-size particles having a substantially globular shape.

19. A method as in claim 16, wherein the defracturing apparatus includes a plurality of tumblers comprising a non-metallic material.

20. A method as in claim 19, wherein the non-metallic material includes rubber.

21. A method as in claim 19, wherein the tumblers have a diameter of at least one inch.

22. A method as in claim 16, wherein the dryer includes forced-air heating, the forced air having a counter flow to a flow of the pozzolanic material being introduced into the dryer.

23. A method as in claim 16, wherein smaller pozzolanic particles are retained in the dryer for a shorter period of time than larger pozzolanic particles, on average.

24. A method as in claim 16, wherein the dryer separates an incoming pozzolanic stream into at least a coarse fraction and a fine fraction, wherein the coarse fraction is exposed to higher temperatures in the dryer compared to the fine fraction.

25. A method as in claim 24, wherein thermal fracture system is configured to allow from about 0.5% to about 20% of the coarse fraction to pass through a hottest section of the dryer.

26. A method as in claim 16, further comprising operating the dryer using natural gas.

27. A method as in claim 16, wherein the pozzolanic material is heated to a temperature in a range from about 220° F. to about 625° F.

* * * * *